United States Patent [19]

Murokh et al.

[11] Patent Number: 5,798,146
[45] Date of Patent: Aug. 25, 1998

[54] SURFACE CHARGING TO IMPROVE WETTABILITY

[75] Inventors: Igor Y. Murokh, Los Angeles; Alex A. Kerner, Pacific Palisades, both of Calif.

[73] Assignee: Tri-Star Technologies, El Segundo, Calif.

[21] Appl. No.: 528,327

[22] Filed: Sep. 14, 1995

[51] Int. Cl.$^6$ .............................. B05D 1/04; B05D 1/06; B05D 3/10
[52] U.S. Cl. .................... 427/458; 427/460; 427/299; 427/322; 427/533; 427/472
[58] Field of Search ...................... 427/458, 460, 427/475, 483, 533, 536, 472, 299, 322; 204/165, 157.6; 422/186.05

[56] References Cited

U.S. PATENT DOCUMENTS

| | | | |
|---|---|---|---|
| 2,952,559 | 9/1960 | Nadeau | 427/472 |
| 3,288,638 | 11/1966 | Van Paassen et al. | 422/186.05 |
| 3,391,044 | 7/1968 | Kaghan et al. | 427/536 |
| 3,914,521 | 10/1975 | Beatty et al. | 428/461 |
| 4,267,202 | 5/1981 | Nakayama et al. | 427/536 |
| 4,468,412 | 8/1984 | Fujii et al. | 427/536 |
| 4,717,516 | 1/1988 | Isaka et al. | 264/22 |
| 5,215,636 | 6/1993 | Danilychev et al. | 204/164 |
| 5,215,637 | 6/1993 | Williams | 204/164 |

FOREIGN PATENT DOCUMENTS 4107945  9/1992  Germany.

OTHER PUBLICATIONS

M. Rosoff. Surface chemistry and polymers. In: Physical Methods in macromolecular chemistry. (ed. B. Carroll) vol. 1, New York, 1969, pp. 69–107.

M. Bernett, W. Zisman. Wetting of low energy solids by aqueous solutions of highly fluorinated acids and salts. J. Phys. Chem., vol. 63, 1959, pp. 1911–1916.

D. Goldshtein et al. Modification of the surface of polytetra–fluoroethylene in a flow discharge plasma in vapors of various organic compounds. High Energy Chem. vol. 25, No. 4, 1991, pp. 303–306.

A. Gilman et al. Effect of treatment conditions in a glow discharge on the wettability of PTFE. ibid. vol. 24, No. 1, 1990, pp. 64–66.

M. Kusabiraki. Surface modification of PRFE by discharges. Japanese J. Appl. Phys. Part 1, vol. 29, No. 12, 1990, pp. 2809–2814.

(List continued on next page.)

*Primary Examiner*—Shrive Beck
*Assistant Examiner*—Fred J. Parker
*Attorney, Agent, or Firm*—Bruce A. Jagger

[57] ABSTRACT

Method of improving wetting and adhesive properties of dielectric materials by injecting electrical charges into the substrate under conditions such that the primary effect on the surface is that of charging so that improved wettability of the surface will be achieved. Flowable materials are then applied to the surface and cured in situ to permanently adhere the flowable materials to the surface.

9 Claims, 1 Drawing Sheet

OTHER PUBLICATIONS

S. Kaplan et al. Plasma processes and adhesive bonding of polytetrafluoroethylene. Surface and Interface Analysis. Vol. 20, No. 5, 1993, pp. 331–336.

L. Torrisi, G. Foti. Ion beam etching of polytetrafluoroethylene. J. Mater. Res. vol. 5, No. 11, 1990, pp. 2723–2728.

S. Yamamoto et al. Sputter etching mechanism and changes of surface structure of PTFE. Electrical Engineering in Japan. Vol. 113, No. 1, 1993, pp. 18–24.

M. Chtaib et al. Polymer surface reactivity enhancement by ultraviolet ArF laser irradiation. J. Vac. SCsi. Technol. vol. A7, No. 6, 1989, pp. 3233–3237.

W. Kesting et al. Pulse–and time–dependent observation of UV–laser–induced structures on polymer surfaces. Applied Surface Science. Vol. 54, 1992, pp. 330–335.

G. Sessler (ed). Electrets. Topics in Applied Physics, vol. 33, Springer–Verlag, 1987, p. 455.

B. Gross. Nlectret research—stages in its development. IEEE Trans. Elec. Insul. vol. 21, No. 3, 1986, pp. 249–269.

G. Sessler and J. West–Production of high quasipermanent charge densities on polymer foils by application of breakdown fields. J. Appl. Phys. vol. 43, No. 3, 1972, pp. 922–926.

W. Stark. Electret formation by electrical discharge in air. J. Electrostatics, vol. 22, 1989, pp. 329–339.

G. Ferreira, Mr. Figueiredo. Corona charging of electrets. IEEE Trans. Elec. Insul. vol. 27, No. 4, 1992, pp. 719–738.

R. Moreno, G. Gross. Measurement of potensial buildup and decay, surface charge density, and charging currents of corona charged polymer foil electrets. J. Appl. Phys. vol. 47, No. 8, 1976, pp. 3397–3402.

G. Sessler et al. Charge distribution in teflon FEP negatively corona–charged to high potentials. J. Appl. Phys. vol. 71, No. 5, 1992, pp. 2280–2284.

P. Gunther. Mechanism of charge storage in electron–beam or corona–charged silicon–dioxide electrets. IEEE Trans. Elec. Insul. vol. 26, No. 1, 1991, pp. 42–48.

B. MacDonald and B. Fallone. Improved modeling of surface distributions in electret ionization chambers. Rev. Sci. Instrum. vol. 65, No. 3, 1994, pp. 730–735.

B. Chapman. Glow discharge processes. New York, 1980, p. 407.

M. Shahin. Mass–spectrometric studies of corona discharges in air at atmospheric pressures. J. Chem. Phys. vol. 43, No. 7, 1965, pp. 2600–2605.

Unipolar corona charge in wire–plane geometry: A first principles numerical computation. J. Appl. Phys. 65, No. 12, 1989, pp. 4617–4624.

H. Sawin and E. Gogolides. Continuum modeling of rf glow discharges. SPIE vol. 1185 Dry Processing for Submicrometer Lithography. 1989, pp. 198–208.

R. Beverly III. Electrical gasdynamic, and radiative properties of planar surface discharge. J. Appl. Phys. vol. 60, No. 1, 1986, pp. 104–124.

Exair–Ionizers. Exair Corp. Catalog No. 95, pp. 43–50.

SURFACE CHARGING TO IMPROVE WETTABILITY

BACKGROUND OF THE INVENTION

1. Field of the Invention

The invention relates in general to treating the surfaces of dielectric materials to improve their wettability and adhesion characteristics, and, in particular, to uniformly charging the surfaces of dielectrics with electrical charges so that a flowable material may be applied to and permanently affixed to the surface.

2. Description of the Prior Art

It is well known that permanently printing, coating, marking, potting or bonding, or the like, on the surfaces of many non-conductive materials which have dielectric properties (dielectrics) is impossible without some special pre-treatment of the surface. This is because, inter alia, of the low surface energy of dielectric materials such as, for example, fluoropolymers and polyalkylenes, and the like. The substances which are desired to be applied and permanently adhered to the dielectric surfaces can be liquids, gels, slurries, or the like, all of which are characterized as flowable materials. Printing inks, adhesives, paints, other coatings, potting materials, and the like, are all such flowable materials. These dielectric materials are widely used for many purposes such as, for example, insulation on wire, tubing, sheets, webs, parts of various shapes, and the like. In some circumstances it is critical to their use or safety that these materials be permanently marked, coated or potted. Further, not having the capability of bonding these low surface energy dielectric materials to themselves or other surfaces substantially limits their utility.

In order to improve the wettability and adhesive characteristics of dielectrics prior workers had bombarded them with a corona discharge, ion beams, electron beams, ultra violet radiation, and the like, in a process in which enough energy was used to break chemical bonds or otherwise cause a chemical transformation of the dielectric at the surface. The chemical transformation or degradation of the surface was generally allowed to progress to the point where physical degradation of the surface was detectable (etching or ablation of material). The resulting degraded surface was believed to have improved wettability and adhesive characteristics. In practice this had proven to be generally unsatisfactory for wide use. Many prior processes had been very expensive because of the large required capital investment and operating expenses. Close control of the prior processes had generally been required to avoid excess degradation of the surfaces. As to the corona or glow discharge systems, the generally perceived need for sub-atmospheric pressure conditions, special gas environments, plural electrodes to generate the corona discharge (high voltage and ground), and precise controls for limiting the exposure of the surface to the corona discharge so as to avoid burning it in spots, or otherwise over-degrading it, had greatly limited the utility of the process. The inherently uneven nature of the corona discharge had presented serious problems to its use. Further, generally only very simple shapes could be so treated. Irregular, arcuate, angular, and otherwise irregular and compound surfaces generally had been considered to be extremely difficult, if not impossible, to uniformly degrade with corona discharge. The requirement for plural electrodes had been particularly troublesome where the dielectric could not, for example, be backed up by a grounded electrode. The uneven treatment which risked localized, or even generalized, excess degrading of the surface (burning) had been generally believed to be an inherent problem with this corona treatment. Precision controls, special atmospheres (argon) and pressures (near vacuum) had brought the cost and difficulty of operating such corona discharge systems for chemically modifying surfaces up to such high levels as to make them impractical for many applications. The perceived limitation of the need for substantially uniform substrate surface shapes had further limited the usefulness of corona surface treatment. The etching of the surface necessarily risked some loss of function for the dielectric. Thus, the insulation on, for example, wire, might have to be increased in thickness to accommodate the anticipated surface degradation.

It is well known that the surfaces of dielectric materials can be charged using, inter alia, a corona discharge, an electron beam, an ion gun, or the like, as a source of an electrical charge or flux of charged particles (electrons and ions). The electrical charges which result from the impact of the charged particles on the surface of the workpiece are trapped in the imperfections in dielectric surfaces. Those electrical charges stay on the dielectric surfaces for prolonged periods of time ranging from several minutes to several years. Electrets are widely produced in this manner. Often electrets comprise fluoropolymers, and they hold their charges for long periods, frequently for years under normal conditions. Many dielectrics will not function well as electrets because they do not hold a charge for any extended period of time. In general, only certain organic polymers are used as electrets. In general, the power settings for charging electrets are not sufficient to cause significant chemical or physical transformations to take place in the surface. Often the charging is such that the entire volume of the dielectric is charged, not just the surface.

It is well known that a corona or glow discharge can be created in air, at ambient atmospheric pressure, using a single sharp edged electrode such as, for example, a needle or a razor edge. Such corona discharges are, however, known to be very non-uniform. That is, the flux of charged particles so produced is of uneven density. In general, the energy is focused in a few spots. When a surface is exposed to such a corona discharge there is a risk of burning those spots where the energy is focused and under exposing other spots on the rest of the surface.

It is well known that a stream of air after it has passed through a glow discharge will contain ions. Such ionized air flows had been widely used to remove static electricity from polymeric film, plastic parts, and the like. In general, the glow discharge necessary to produce such an ionized air flow had been produced by the use of a pair of electrodes under ambient atmospheric conditions. In general, the workpieces which were treated by such an ionized air flow had been spaced from the region of the glow discharge by at least several times the diameter of the glow discharge at its largest point, and substantially out of contact with the high energy particles in the discharge. Thus, the effect produced by the flow of ionized air over the surface of the workpiece was generally that of removing static electricity from the surface. Being removed from the high energy particles in the glow or corona discharge itself there had generally been no risk of harming the surface. In general, all of the high energy ions and electrons flow between electrodes in such static removing devices. The stream of air apparently carries some ions away from the region between the electrodes. By the time the charged particles reach the surface of the remote workpiece, because of dissipation, they do not have sufficient energy to charge the surface. The stream of air apparently does not carry any significant number of high energy electrons away from the region between the electrodes. In general, no significant charging of the surface could occur under these conditions.

Those concerned with these problems have recognized the need for improvement. These and other difficulties of the prior art have been overcome according to the present invention.

BRIEF SUMMARY OF THE INVENTION

A preferred embodiment of the process according to the present invention comprises charging the surface of a dielectric by supplying a uniform flux of charged particles at that surface under uniform conditions which are such that there is no significant degradation of any part of the surface before the entire surface to be treated is uniformly charged to the desired degree. That is, the degree of any degradation of the surface after exposure to the charging process, is so slight that it plays no generally measurable role in increasing the wettability or adhesion of the surface. This considers the measurement of wettability and adhesion at the macro level and does not consider very minute effects which may be detectable only at the micro level, and which have an insignificant effect on the adhesion and wettability characteristics of the workpiece.

It is well known that an electrical charge accumulated in an electret during a charging process may be driven off by heating the dielectric (thermally stimulated discharge). Because of this, one indication, for example, of whether or not the increase in surface energy exhibited by the charged surface is due to the charge or some other phenomenon such as chemical transformation or physical degradation of the surface is to first measure the surface tension of the surface using, for example, a calibrated marker, in the uncharged state. Next, the surface tension of the surface is measured in the charged state. The surface is then, for example, heated or otherwise treated to drive off the electrical charge. The resulting surface tension of the decharged surface is measured. If the original uncharged and final decharged surfaces exhibit approximately the same surface tension (the difference between the original uncharged surface tension and the decharged surface tension divided by the original surface tension should be within approximately 15 percent) then the increase in the surface tension was apparently due to the charge and not to any significant surface degradation. Also, this is an indication that the charging does not significantly degrade the surface. For ease of reference such a process of measuring and comparing at the uncharged-charged-decharged conditions as well is referred to herein as a "charging-measuring cycle". The undegraded surface is conveniently described as exhibiting "no significant degradation". Where the surface tension of a workpiece is permanently changed by more than approximately 15 percent from the original after the charge is removed the degraded surface is conveniently described as exhibiting "significant degradation".

As presently understood, it is believed that according to one preferred embodiment, when a break down potential is applied to a single sharp edged electrode, under ambient conditions, in air, a glow discharge occurs wherein electrons and ions flow along the resulting electrical field away from or toward the sharp edge, depending on the polarity. In general only a few milliamperes of current are used. Workpieces such as, for example, tubes, sheets, film, or insulated wires in which there is no conductor or the conductor is not grounded, or the like, can be treated by this single electrode. Preferably, the workpiece does not include any embedded electrical conductor. If an electrical conductor is present it should be embedded entirely within the dielectric so there is no direct contact with the flux of charged particles. The surface of a dielectric workpiece immersed in the stream of these particles, within the glow discharge, will be charged. It has been found that if the glow discharge is immersed in a flowing stream of air the trajectories of the charged particles are apparently more uniformly distributed in the volume of the glow discharge and when they impact the surface of the workpiece. The surface of the workpiece is thus treated uniformly and is not burned or otherwise degraded in localized spots. In general, the stream of flowing gas is directed approximately at the surface of the dielectric substrate which is to be charged, and the surface is positioned substantially within the visible corona discharge. If other parts of the dielectric surface which are not approximately facing the flux of charged particles are to be charged, either the workpiece should be turned to approximately face the stream of charged particles or several sources of charged particles should be provided. If the charging system is, for example, contained in a hand held device, the device may be moved over the workpiece as may be desired.

As presently understood, it is believed that the air stream causes the uniform distribution of the ions and electrons and does not act merely as a cooling agent. Ions are created, for example, by the collision of neutral molecules with electrons in the glow discharge and may include both positive and negative ions. UV photons also are present and contribute to the formation of ions. The ions generally have much lower velocities than the electrons. In general the electrons appear to be substantially uneffected by the stream of air. The atoms, molecules and ions with which the electrons interact are, however, generally part of the air stream and are moving therewith. The electrons are deflected slightly from their paths in the electric field by reason of the fact that the atoms and molecules with which they interact are effected by the flow of the air stream. The trajectories of the electrons, unlike the ions, are generally not significantly affected by the air stream. When the workpiece is within the glow discharge the direction at which the air stream is applied to the glow discharge generally does not significantly effect the charging of the surface of the workpiece. Apparently, the high energy particles in the glow discharge are primarily responsible for the charging. The air stream, when it impinges on the surface of the workpiece, also acts to cool that surface. Preferably, the flow of air is directed so as to achieve the maximum cooling effect.

It is believed that the stream of flowing gas provides at least two significant advantages. The gas cools the surface and apparently renders the density of the flux of charged particles substantially uniform at the surface of the substrate, even for highly arcuate, angular, convoluted or other irregular shaped surfaces. It is thus possible to expose one area of a substrate to the combined corona-gas stream for as much as, for example, 20 minutes without burning spots on it. Surface charging, according to the present invention, however, generally only requires exposure times in the order of approximately one half to 10 seconds or even less. Thus, close coordination between the movement of the substrate and, for example, the power being supplied to the corona discharge, is unnecessary. No special atmospheres or conditions are required. This greatly simplifies the equipment requirements.

The stream of flowing gas generally is supplied at a velocity which is sufficient to change the profile or shape of the visible corona discharge which is immersed within it by an amount which is visible to the naked eye from a distance of about 2 feet, and preferably from a distance of about 5 feet. Air velocities of from approximately 10 to 300 linear meters per second in air at ambient conditions have been found to be satisfactory. Higher velocities may be used but are generally not preferred because they generally do not contribute to the charging of the surface and may even decrease the effectiveness of the charging process. Also, the noise of air being discharged at higher velocities dictates that special safety equipment be employed. Air at ambient pressure is the preferred gas because its use in a monoelectrode system requires only a device to accelerate it. Additional gasses may be added to the stream of air, if desired, to modify the corona discharge or its effect on the surface. In a less preferred configuration the operation can, if desired, be enclosed within a container and gases other than air can be used and the system operated at other than atmospheric pressures. Ambient atmospheres in which the present invention may be practiced in all of its embodiments include those in which human beings can function without special survival equipment.

The minimum velocity of gas flow required to distribute the energy uniformly over the surface varies with the power setting, the distance between the electrode and the surface, and other operating parameters of the system. The required minimum velocity is conveniently established for a particular system, for example, by first operating the system at the desired power setting and other conditions in a stagnant body of gas and observing whether degradation of the surface occurs before the desired degree of surface charging is achieved. Next a low rate of gas flow is established and the system is again operated at the desired conditions. If undesired degradation is observed the procedure is repeated with a higher flow rate of gas. This is repeated until it is determined that a certain rate of gas flow for the desired operating conditions prevents degradation of the surface before the desired degree of surface charging is achieved. Generally, the system is operated at a gas flow rate which is somewhat above the minimum that is required to prevent degrading the surface. For ease of reference this iterative process for determining the minimum rate of gas flow is referred to herein as "gas flow rate determination". Whether determined by this or some other process the rate so determined is conveniently referred to as the "minimum gas flow rate".

According to one preferred embodiment, the corona discharge is completely immersed in a stream of air which flows generally from the origin of the corona discharge towards the surface which is to be charged. This flow pattern is conveniently achieved, for example, through the use of a needle as the source of the corona discharge. If the needle is positioned axially within a hollow dielectric tube and air is blown axially through the tube the flow of air generally tends to shorten the visible corona discharge. Placing the surface to be charged within the visible corona discharge quickly causes the surface to become substantially saturated with electrical charges. In general the surface should be within the visible corona although it may be spaced from the corona a distance equal to as much as approximately three diameters of the visible corona if it is within an air stream which carries the charged particles at and if exposure times are increased and low levels of surface charging are acceptable. In general it should be no more than a distance equal to 10 diameters of the air discharge port. For non-circular air discharge ports the limiting dimension is generally the smallest dimension and this limiting dimension is intended to be included in the term "diameter" as used herein. If the surface is removed from the visible corona by a distance equal to more than approximately three diameters of the visible corona the advantages of the present invention are generally not achieved because the surface is not substantially within the flux of charged particles.

Where a second grounded electrode is available as, for example, within insulated wire, a preferred embodiment comprises a ring shaped high voltage electrode through which the generally cylindrical insulated wire passes. In general the inside diameter of the ring electrode is such that there is only a few millimeters of space between the inside surface of the electrode and the surface to be charged. The surface of the insulation or other dielectric is preferably charged to the desired degree of saturation by operating the system at approximately an energy level where a visible glow discharge forms between the surface to be charged and the electrode. In general, the system operates in ambient atmospheric conditions of pressure, temperature, air and humidity, and with a current of only a few milliamperes. Such low power levels prevent any significant degradation of the surface even if the wire remains stationary within the ring electrode for as much as a few minutes. Such systems are extremely economical in both initial capital investment and operating expenses. In general a flowing stream of air is not necessary in this embodiment. A stream of air may, however, be used if desired to cool the substrate. As will be understood by those skilled in the art, the configuration of the electrodes in a plural electrode system will be dictated at least in part by the shape of the surface which is to be charged. Further, the current, potential and frequency utilized in creating a flux of charged particles may vary depending on, for example, the physical dimensions of the components of the system and the relationships between the current, potential and frequency. In general, frequencies in excess of 1,000 hertz, and particularly frequencies in the radio frequency range, for example, from approximately 10 megahertz to 50 megahertz are preferred for reasons of efficiency and simplicity in ambient conditions, although even direct current could be used, for example, in an electron beam gun or in a conductive liquid medium.

The point at which a particular surface becomes substantially fully charged or saturated varies depending upon the power setting. Saturation being defined as approximately the maximum charge that a surface will accept at a given power setting without risking degrading the surface to a measurable degree. In general, the higher the power setting the more charge the surface will accept before reaching substantial saturation. Also, in general, the surface reaches substantial saturation more quickly at higher power settings. If desired the surface may be only partially charged, provided that the partial charge is sufficient to secure the desired wetting and adhesion. Exposure of the surface, for example, to a high power setting for only a fraction of a second may be sufficient to give the surface the degree of charge which is needed for a particular application. Thus, rapid treatment of the surface may be achieved by using high power settings which increase both the rate of charging and the amount of the charge. Where a substantially fully saturated or fully charged surface is desired, higher power settings are generally preferable so as to minimize processing time. In general processing times of less than approximately 5 seconds are most desired for commercial applications.

The charged substrate surface exhibits substantially increased wettability (increased surface tension) and adhesion so that many flowable materials when applied to it will adhere or bond tightly to it. Once adhered to the substrate the flowable materials can be cured by any appropriate means, such as, for example, heating, drying, electron beam irradiation, ultraviolet irradiation, chemical treatment, or the like. Heat tends to drive the electrical charges off of the surface. For a heat curable flowable material heating may thus accomplish both curing and de-charging of the surface. A portion of the surface may be masked to prevent its being charged, if desired. Thus, the flowable material can wet one area of the substrate but not adjacent areas. The pattern in which the flowable material is adhered may thus be controlled.

Generally, the surface charging systems according to this invention operate with a current density of, for example, from approximately 0.1 to 100 milliamperes per square centimeter, at approximately 2 to 100 kilovolts potential, and at a frequency of from approximately 50 hertz to 100 megahertz. Such systems generally draw no more than a few hundred watts of power so they are very economical and safe to operate. Such low power settings also greatly reduce the risk of degrading the surface of the dielectric. Frequencies above the radio frequency range may also be used if desired, although they are generally not preferred. Plural electrode systems are preferably operated just above the threshold where a visible glow discharge forms. Just below this threshold some faint glow may be visible from time to time particularly around some of the edges of the high voltage electrode. At or preferably just above the threshold where a corona discharge appears a flux of charges sufficient to very quickly charge the surface within the ring electrode to saturation is generated. This power setting is, however, so low that the surface can be exposed to it for lengthy periods in excess of, for example, 30 seconds, or even 5 minutes, without suffering any generally measurable degradation.

The operating conditions in all of the various embodiments of this invention are so mild that the primary effect on the surface of the dielectric is that of charging rather than physical or chemical degradation.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of dielectrics. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Figure 1:
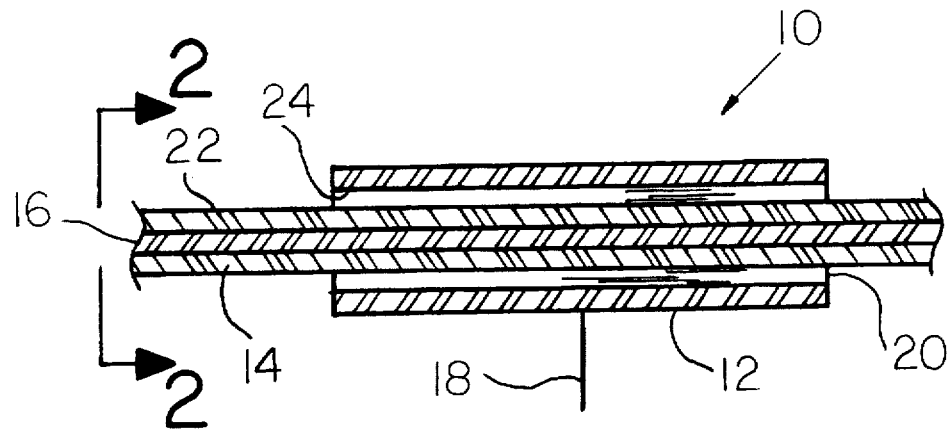
FIG. 1 is a cross-sectional view of a preferred embodiment of the invention where plural electrodes are available.
Figure 2:
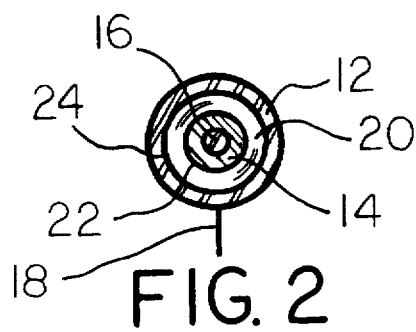
FIG. 2 is a cross-sectional view taken along line 2—2 in FIG. 1.

Referring now, for the purposes of illustration only and not limitation, to the drawings wherein like reference numerals designate identical or corresponding parts throughout the several views, there is illustrated diagrammatically at 10 a dual electrode surface charging system which is particularly adapted to charging generally cylindrical surfaces and includes a ring electrode 12, and a grounded conductor 16 imbedded, for example, in a fluoropolymer dielectric coating 14. Current is supplied to high voltage ring electrode 12 through conductor 18. Dielectric coating 14 defines a generally cylindrical outer surface 22. Cylindrical outer surface 22 is spaced from the inner cylindrical surface 24 of ring electrode 12 by the thickness of air gap 20. The thickness of air gap 20 may range from, for example, approximately 0.5 to 5 millimeters. The physical dimensions of high voltage ring electrode 12 to some extent dictate the power requirements of this plural electrode charging system. The longer the ring electrode 12, for example, the more power that is required. In general the ring electrode 12 is preferably mounted stationary and the workpiece is pulled through it at a rate which is at least sufficient to charge the surface 22 substantially to saturation while the workpiece is within the ring. As will be understood by those skilled in the art, the physical dimensions of the system are largely determined by the diameter of the workpiece and the rate at which the workpiece is to be processed. In operation the dielectric surface is preferably drawn through the ring electrode at approximately a constant rate of travel. The length of the ring electrode is generally adjusted to provide the exposure time which is required to charge the surface of the dielectric at the desired rate of travel. In general the ring electrode is configured so that it may be split along its longitudinal axis. It is thus able to accommodate an endless length of, for example, insulated wire, without cutting the wire. In general, the entrance and exit ends of the electrode are shaped so as to avoid sharp edges which would promote the formation of a glow discharge at those edges.

Preferably, the system is operated at a level which is just above the threshold for forming a visible corona. Such a power setting minimizes the risk of degrading the surface and provides a very efficient operation. In general, decreasing the power by less than 10 percent, and preferably, by less than approximately three percent, causes the disappearance of most or all of the visible glow discharge. Preferably, the conductor (electrode) within the workpiece is grounded. As will be understood by those skilled in the art, if the conductor is massive enough there is no need to ground it. This applies particularly, for example, to a situation where a wire several thousand feet long is to be treated. The ground electrode is described as a ground electrode even though it may not be actually grounded, because it is operated at a much lower potential than the high voltage ring electrode.

Because there is no significant degradation of the surface with prolonged exposure to the low power settings which are used according to this invention, if desired, full saturation can be assured, for example, by increasing the exposure times to considerably in excess of the minimum that is required. As will be understood by those skilled in the art the ring electrode 12 may have an inside configuration which is not circular. If desired, the ring electrode may be configured to match the shape of an irregular surface. Also, the ring may be discontinuous if desired, although generally a continuous ring is preferred. Ring electrodes are generally preferred where the surface of the substrate which is to be charged is generally cylindrical as generally in the case of wire. Preferably the shape of the electrode generally conforms to the shape of the surface to be charged. Where the substrate is, for example, rectangular, a rectangular high voltage electrode is preferred. Where, for example, the surface of a coating on a grounded flat plate is to be charged, the high voltage electrode should generally be flat to conform to the surface of the coating.

The surface of a polytetrafluoroethylene (Teflon) coated 20 gauge copper wire having an outside diameter of 55 mils was charged to approximate saturation after approximately 60 seconds exposure using a ring electrode having a length of 4 inches, an outside diameter of 0.25 inches, and an inside diameter of 0.125 inches. The copper wire was grounded. A current of 10 milliamperes at 6 kilovolts potential was supplied to the ring electrode at a frequency of 1000 kilohertz. The current density was approximately 2 milliamperes per square centimeter. The charged surface was tested by marking it with an Accu Dyne marker pen and it was found to have an apparent surface tension of approximately 60 dynes per centimeter. Before charging the same surface was found, by use of the same method, to have a surface tension of less than 30 dynes per centimeter. The Accu Dyne markers do not measure below 30 dynes per centimeter. The charged surface was imprinted with a printing ink which has a surface tension of approximately 40 dyne per centimeter. The imprinting took place approximately 10 seconds after the surface was charged. The ink was cured by heating it to a temperature of approximately 250 Celsius for a period of 1 hour. After the heating step the surface tension of the surface was tested and found to be approximately what it was before the charging took place. The ink was, however, tightly adhered to the surface so that bending and rubbing the imprinted surface by hand under normal pressure did not appear to have any effect on the printing. It was necessary to abrade the surface to remove the printing. The surface holds its charge, unless treated to drive it off, for a period of several days or more. There is thus no need to carry out the printing or marking step immediately after the surface charging step.

The width of the air gap 20 may be varied from the condition where it is only a few millimeters wide to a condition where it is equal to the diameter of the workpiece, or even more, provided the voltage potential is increased or the composition of the atmosphere is changed so as to provide the threshold conditions for breakdown voltage for a given air gap. In this way irregular shapes may be treated in a cylindrical electrode. In general the air gap for a regularly shaped workpiece surface should be on the order of from approximately 0.5 to 5 millimeters in air with voltages up to 10,000 volts. Preferably, the workpiece does not touch the inside surface 24 of the ring electrode 12. In general, guides are provided at least one end of the electrode so as to keep the workpiece concentric with the electrode.

Figure 3:
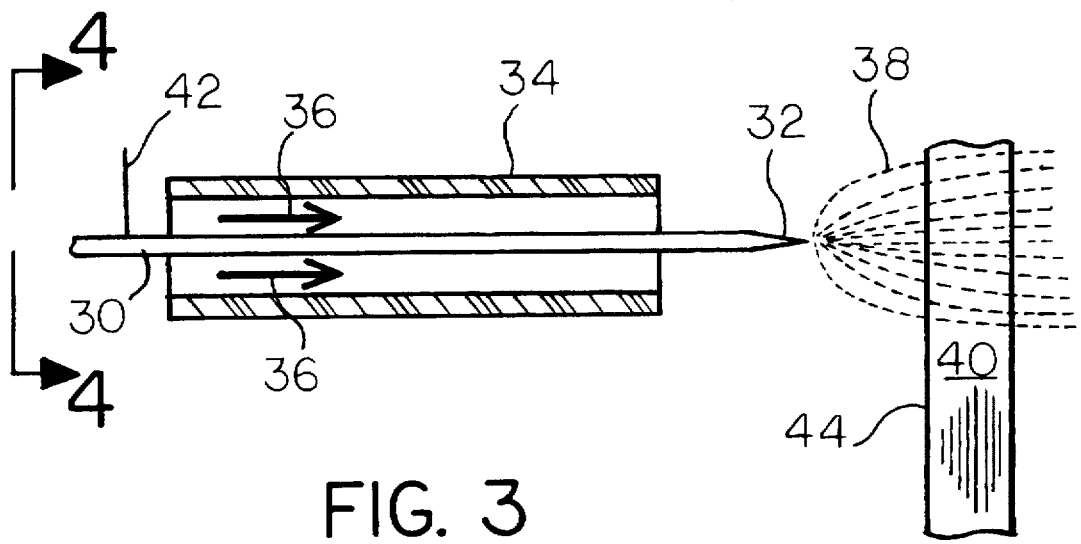
FIG. 3 is a cross-sectional view of a preferred embodiment of the invention where a single electrode is available.

With particular reference to the specific embodiment illustrated diagrammatically in FIG. 3, a single electrode 30 terminates in a needle point 32. Needle 30 is substantially surrounded by a dielectric tube 34. A flowing stream of gas, for example, air, is directed through the interior of tube 34 as indicated by arrows 36. The flow of air completely surrounds needle 30 so that the corona or glow discharge 38 at needle point 32 is substantially immersed in the stream of air. This air flow blows the charged particles somewhat axially of the visible corona away from the corona discharge source at needle point 32 and generally uniformly onto the generally facing surface of dielectric rod 40. The visible corona is somewhat shaped by the flowing stream of air. It is generally shortened by at least approximately an eighth of an inch and preferably by at least one quarter of an inch in an axial direction, as compared to the condition where no air stream is operating on it. The rod 40 is positioned within the extended visible corona. The portion of surface 44 that approximately faces and is touched by the corona in the stream of flowing air is quickly charged to saturation. Those areas of surface 44 that are not exposed to the corona-air stream remain substantially uncharged. For a cylindrical surface the charging is effective through approximately a 180 degree arc of surface. Beyond that it is generally necessary to provide multiple corona-air stream sources or move the workpiece so as to expose all surfaces to a single corona-air stream source, if charging of the entire surface is desired. Current is supplied to the single electrode 30 through lead 42.

In general, air flows of from approximately 10 to 300 meters per second, and preferably from approximately 30 to 50 meters per second, are suitable for use according to this invention. In general currents of from approximately 1 to 500 milliamperes, and preferably from approximately 10 to 50 milliamperes, at potentials of from approximately 1 to 100 kilovolts, and preferably from approximately 5 to 15 kilovolts, are supplied at frequencies of from approximately 60 hertz to 100 megahertz, and preferably from 0.5 to 10 megahertz. In general the current density should be from approximately 0.1 to 100 milliampere per centimeter squared, and preferably the current density is from approximately 1 to 10 milliamperes per square centimeter. Rod 40 is drawn through the flux of charged particles in the corona-air stream at a rate that exposes the surface 44 to the flux for a period of time, generally from approximately 0.1 to 100 seconds, and preferably from approximately 1 to 5 seconds, sufficient to substantially charge the surface. Generally, the system is operated at such low power settings that the surface 44 could remain stationary within the visible corona for at least 30 seconds and preferably for upwards of 10 minutes without suffering any significant degradation. Thus, no mechanism for providing precise coordination between the rate at which the surface 44 is drawn through the corona-air stream and the power settings at which the system is operated is necessary. The controlling consideration is that of providing sufficient dwell time so that an adequate surface charge is achieved.

Figure 4:
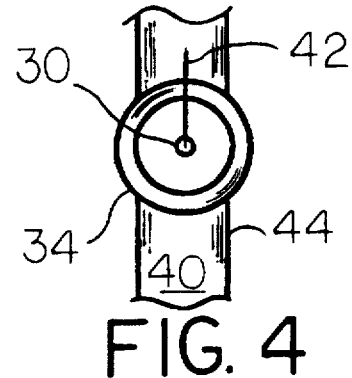
FIG. 4 is a cross-sectional view taken along line 4—4 in FIG. 3.

Single electrode systems such as that illustrated in FIGS. 3 and 4 can be used and are generally equally effective with dielectric covered wire, tubes, sheets or other configurations without regard to whether there is a conductor embedded within the dielectric or not. The surface to be charged need not be simple or regular so long as the entire surface to be charged is exposed directly to the charged flux substantially within the corona discharge.

The surface of a fluoropolymer film having a thickness of about 25 microns and a surface tension of about 18 dynes per centimeter was drawn past a needle having a sharp point and a body diameter of about 0.5 millimeters. The needle was positioned generally concentrically inside of a hollow cylindrical tube having an inside diameter of about 0.25 inches. A stream of air having a velocity of about 30 meters per second was passed through the tube. The needle point projected about 1 millimeter beyond the exit end of the tube. The needle point was spaced from the surface of the fluoropolymer film by about 0.25 inches. A current of about 1 milliamperes per square centimeter at about 12 kilovolts potential was supplied to the needle at a frequency of about 12 megahertz. No backing electrode was present. The fluoropolymer surface was immersed in the visible glow discharge. Without the flow of air through the tube the visible glow discharge extended for approximately 0.5 inches from the tip of the needle. With the air flow established the visible glow discharge extended for approximately 0.25 inches from the tip of the needle. The film was drawn through the corona discharge at a rate of about 20 feet per minute (about 4 inches per second). After a delay of about 10 minutes the surface was tested and found to have a surface tension of about 32 dynes per centimeter. The film surface was allowed to stand in the glow discharge with the air stream flowing for a period of about 30 minutes. Examination of the resulting exposed surface gave no indication of any degradation. The surface tension, however, was found to be approximately 60 dynes per centimeter. Exposure to the same stationary conditions for the same period of time without the stream of flowing air resulted in uneven degradation of the surface in what appeared to be burned spots. Drawing the film through the glow discharge under the same conditions of rate and exposure but without applying the air stream results in uneven surface tension characteristics where the surface tension, appeared to vary from one spot to another.

Repetition of these conditions applied to the exterior of a cylindrical fluoropolymer tube with no conductor in it results in increasing the surface tension from about 34 to 48 dynes per centimeter.

The effect of the glow discharge on the surface falls off rapidly with distance from the needle. The glow discharge on the surface covers an area of approximately 1 square centimeter. At a distance of approximately 3 inches from the edge of the glow discharge there is no significant effect on the surface tension which is exhibited by the surface.

Fluoropolymer surfaces frequently exhibit low surface tensions. Such surfaces are particularly suited for treatment according to the present invention. Other surfaces to which the present invention is applicable generally include dielectrics, such as, for example, polyethylene, polypropylene, polyethyleneterephthalate, polyimide, polypropylene, polyamide, and the like. In general the surface tension of polytetrafluoroethylene polymers is approximately 18 dynes per centimeter. The very low surface energy of this material precludes the wetting of such surfaces by most materials. The process of this invention, in all of its embodiments, is applicable to the treatment of a wide variety of dielectrics. Such dielectric materials include, for example, plastics, ceramics, glass, composites, and the like. Flowable materials with very high surface tensions may be adhered to substrates to which they would not normally adhere through the use of the present invention. For example, the surfaces of substrates which have relatively high surface energies may be charged and wetted by flowable materials with very high surface tensions.

What has been described are preferred embodiments. Obviously many modifications and variations of the present invention are possible in light of the above teachings. It is therefore to be understood that, within the scope of the appended claims, the invention may be practiced otherwise than as specifically described.

What is claimed is:

1. A process for adhering flowable material permanently to the surface of a dielectric workpiece, which process comprises:
    selecting a dielectric workpiece which has a surface, said surface having a first surface tension;
    establishing a substantially uniform flux of charged particles within a glow discharge utilizing a single electrode, said establishing including directing a stream of gas through said substantially uniform flux;
    positioning said surface substantially within said glow discharge, and allowing said surface to be charged so that a substantially uniformly charged surface is produced which has a second surface tension which is greater than said first surface tension and has no significant degradation;
    selecting a flowable material, said flowable material having a third surface tension which is greater than said first tension;
    applying said flowable material to said substantially uniformly charged surface of said dielectric workpiece; and
    curing said flowable material in situ on said surface.

2. A process of claim 1 wherein said positioning includes substantially continuously moving said surface.

3. A process for adhering a flowable material permanently to the surface of a dielectric material by improving the wettability of the surface which comprises:
    selecting a dielectric material having a surface and an entirely imbedded electrical conductor;
    selecting an electrode and positioning it adjacent to but spaced from said surface to form a gap therebetween;
    operating said electrode at a potential which is above a breakdown voltage across said gap to provide a substantially uniform flux of charged particles to charge said surface without causing significant degradation;
    selecting a flowable material;
    applying said flowable material to said charged surface of said dielectric workpiece; and
    curing said flowable material in situ on said surface to permanently adhere said flowable material to said surface.

4. A process for applying a flowable material to the surface of a dielectric workpiece which process comprises:
    selecting a dielectric workpiece which has a surface;
    establishing a corona discharge using only a single sharp edged electrode;
    directing a stream of flowing gas through the corona discharge toward said surface; and
    positioning said surface substantially within the corona discharge and stream of flowing gas, wherein said surface is substantially uniformly charged without causing significant degradation of said surface;
    selecting a flowable material;
    applying said flowable material to said charged surface of said dielectric workpiece; and
    curing said flowable material in situ on said surface to permanently adhere said flowable material to said surface.

5. A process of claim 4 wherein said dielectric workpiece includes an entirely embedded electrical conductor.

6. A process of claim 4 wherein said stream of flowing gas comprises air.

7. A process of claim 4 wherein substantially the entire glow discharge is immersed in said stream of flowing gas.

8. A process of claim 4 wherein said sharp edged electrode is generally needle shaped and the stream of flowing gas is directed generally axially of and surrounding said sharp edged electrode.

9. A process for applying flowable material to the surface of a dielectric workpiece, which process comprises:
    selecting a dielectric workpiece which has a surface;
    establishing a glow discharge at approximately atmospheric pressure;
    directing a stream of flowing gas through the glow discharge;
    positioning said surface substantially within the glow discharge, said stream of flowing gas being directed so as to impinge on said surface to produce a charged surface without causing significant degradation of the surface;
    selecting a flowable material;
    applying the flowable material to said charged surface; and
    curing said flowable material to form cured flowable material permanently adhered to said surface.

* * * * *